United States Patent [19]
Öhlin

[11] Patent Number: 4,620,915
[45] Date of Patent: Nov. 4, 1986

[54] BIPOLAR FINGER ELECTRODE

[75] Inventor: Tommy Öhlin, Nyhamnsläge, Sweden

[73] Assignee: KemaNord Blekkemi AB, Stockholm, Sweden

[21] Appl. No.: 695,280

[22] Filed: Jan. 28, 1985

[30] Foreign Application Priority Data

Jan. 30, 1984 [SE] Sweden ............................. 8400459

[51] Int. Cl.$^4$ .............................................. C25B 11/03
[52] U.S. Cl. ................................. 204/284; 204/254;
204/268; 204/289; 204/290 R; 204/290 F
[58] Field of Search ............................... 204/254–258,
204/268–270, 279, 284, 289, 290 R, 290 F

[56] References Cited

U.S. PATENT DOCUMENTS

| 4,088,551 | 5/1978 | Raetzch et al. | 204/270 |
| 4,108,752 | 8/1978 | Pohto et al. | 204/256 |
| 4,132,622 | 1/1979 | Kenney | 204/268 |
| 4,141,814 | 2/1979 | Boulton | 204/284 |
| 4,339,323 | 7/1982 | Dilmore et al. | 204/256 |
| 4,410,410 | 10/1983 | Deborski | 204/284 |
| 4,444,639 | 4/1984 | Schurig et al. | 204/279 |
| 4,464,243 | 8/1984 | Woolhouse | 204/284 |
| 4,469,577 | 9/1984 | Schmitt et al. | 204/258 |
| 4,482,448 | 11/1984 | Bowen et al. | 204/284 |
| 4,502,935 | 3/1985 | Lohrberg et al. | 204/258 |
| 4,519,888 | 5/1985 | Akazawa et al. | 204/284 |

Primary Examiner—Terryence Chapman
Attorney, Agent, or Firm—Fred Philpitt

[57] ABSTRACT

An electrode for an electrolyzer comprising at least two mechanically joined parts (1, 2) between which electrical connection is maintained by means of several elastic, thin and electrically conductive louvers (4), positioned at an angle to the surfaces, which louvers are pressed to contact with the surfaces of the electrode parts by means of a mechanical joint (6) between the parts.

2 Claims, 3 Drawing Figures

BIPOLAR FINGER ELECTRODE

BACKGROUND

The present invention relates to an electrode for electrolyzers, the electrode being of the type which comprises several parts which are mutually joined by means of a mechanical joint. Multiple-part electrodes of this type are often used, e.g. to arrange electrical connections, to join load bearing parts with chemically active parts and particularly to design bipolar electrodes in which the electrode acts as an anode on one side and as a cathode on the other and where there, as a rule, are different requirements on the materials. It is well known that the selection of joint type often gives rise to serious problems in connection with electrodes since several conditions which are special for this use must be fulfilled besides those which are normally considered for mechanical joints, such as strength and a simple and economical design. For electrode joints the usually very corrosive environment in which the electrode is intended to work must be considered and this places special demands on choice of material and a constructive design. The contact surface between different materials must be kept free from electrolyte but can nevertheless change with time due to proton migration through certain metals. On the other hand, if there are cavities in the construction there is a risk that hydrogen gas of a very high pressure will accumulate in these. Space is often limited which means that sophisticated joints cannot be used. Further, the joint must be such that the dimensions of the electrode will be maintained during a long time also at fairly large temperature variations as electrolyzers are often operated at elevated temperatures. Dimension changes can cause a changed distance and thus a changed resistance between the electrochemically active surfaces resulting in a decreased efficiency or in leaks leading to current or electrolyte leakage. Last but not least, the joint must fulfil high demands on electric conductivity as high currents and current densities are usually used. A particular problem in connection with this is that the contact surface tends to change with time and to age, resulting in an increased electrical resistance. The problems are especially pronounced when chemically unstable materials are used in the electrode.

Several types of joints have been used in connection with electrodes. Bolting is a common method which allows high flexibility in the design. However, the contact pressure will not be uniform and will be high only near each bolt. Further, the joints have several cavities and the final constructions tend to be ungainly and heavy. The possibilities to use welding are limited since several electrode materials cannot be welded to each other and welding can further lead to built in stresses in the construction which will appear at ageing and temperature variations. Further, welded joints cannot be released and they often leave cavities in the joint. Explosion welding gives a good electrical conductivity but is a costly method which further can lead to a tendency to bending at thermal expansion, an erratic stability of the joint and less reproducible results. With press- and shrinkage-joints sufficiently high contact pressures can be maintained so that a hydride formation due to proton migration will not occur. However, the joints will easily become complicated with a risk of dimension changes at subsequent welding.

THE INVENTION GENERALLY

The object of the present invention is to offer a construction of an multiple-part electrode which fulfils the above mentioned requirements better than those previously suggested and also avoids the described problems to a greater extent. It is a particular object of the invention to offer a type of joint which gives a good dimension stability and good conductivity and a very small tendency to changes in the contact surface due to ageing or to problems with hydrogen migration in the construction.

These objects are achieved by means of the characterizing features as evident from the claims.

According to the invention electrical contact is maintained between the surfaces of the electrode parts by means of several elastic, thin and electrically conductive louvers positioned at an angle to the surfaces which are pressed against the surfaces and by this several advantages are gained. Despite the fact that the current at the contact points of the louvers will be forced to a strong current concentration, the total voltage drop will be small as the distance with high current density will be very short.

Further, as the louvers are elastic contact at at least one point will always be guaranteed for each contact surface for each louver and the conductivity in this point will be good as the totally applied press force on the louver is distributed over a very small area in the contact point. For the same reasons the total joining force can be small and exerted by a few bolts or other mechanical joints, and this in combination with the small demand on space for the louvers makes it possible to have a compact and light electrode construction with good space for active electrode surfaces. The low mechanical joining force gives diminished risk of unexpected dimension changes of the electrode when used for a longer time. The pressure in the contact points counteracts formation of hydrate and other passivating coating so that the conductivity in these points will remain high. Proportionally, the proton migration will decrease faster than the electron flow at a decreasing contact surface. The elastic movements of the louvers in connection with for example temperature variations will give a certain continuous friction at the contact points which further counteracts film formation. If a plating is desired in a known manner to prevent coatings and proton migration it can often be restricted to the louvers or the edges of these. As contact is required only at a controlled number of points the main area of the opposite surfaces of the electrode parts can be kept separated from each other and thereby proton migration over the main area of the surface is prevented. As the parts generally are of different materials a separation is also valuable in order to prevent tensions and flexing tendencies due to non-uniform thermal expansion. The contact area can easily be sealed against the surrounding environment by absence of extensive leadthroughs or similar connection means. Finally, the joint can be released at maintenance and servicing and with the louver contact means only an insignificant treatment of the electrode part surfaces is required.

Further objects and advantages of the invention will be evident from the detailed description below.

DETAILED DESCRIPTION OF THE INVENTION

The invention can be applied whenever a joint is desired in a multiple part electrode where the quality of the contact in the joint surface is important, which normally is the case when the joint is intended to have an electrically conductive function in addition to the purely mechanical joining of the parts of the electrode. The electrically conductive function also poses requirements on a low resistance in the contact surface even after longtime usage although the resistance generally increases with the ageing of the joint. Joints of this kind can exist at several places in an electrode construction e.g. at connections for external conductors or internally in the electrode. The invention is particularly applicable when conductors of different materials are to be joined to each other as changes and ageing in the contact surface is greater between different materials due to local electrochemical phenomena under influence of the traversed current. Especially for bipolar electrodes, where on side of the electrode is designed to act as an anode in a cell space while the other is designed to act as a cathode in an adjacent cell space, the material for the anode and cathode side, respectively, must usually be selected with respect to several specific factors for the different reactions such as catalytic effect, developed overvoltages and resistance to formed products. The material must thus primarily be selected with respect to these factors and the joining of the materials can thus be problematic as materials which are particularly difficult to weld or materials which are not stable to changes might be included.

The electrical connection between the electrode parts is according to the invention obtained by means of angled louvers which are elastically pressed against the surfaces. Such louvers are known per se as electrical connecting means in other technical applications and described for example in the U.S. Pat. Nos. 3,453,587 and 3,861,595 which hereby are incorporated by reference in the present disclosure. As evident from these patents several louvers are suitably produced from a metal sheet by slitting this with a number of parallel slits and the material between the slits is then jolted so that they will form an angle to the original sheet surface. It is here a condition that the slitting is not carried across the entire sheet but instead that an unslitted edge strip is left and forms a connection between several louvers. The ends of the slits can advantageously be enlarged so that additional recesses are formed near the connecting edge strip which facilitates the jolting and reduces the risk of crack formation.

If at least two, and preferably several, mutually parallel louvers are kept together in this manner at their edge strips no further fastening means are required for the louvers. The unit of several louvers kept together can be placed between the surfaces which are to be electrically connected and the surfaces can then be pressed towards each other and the louvers will be pressed against both surfaces with a certain spring pressure. The slits are suitably punched in such a manner that the edges of the louvers which are angled out from the common connecting plane are not quite straight but convex curved so that the edge at contact with a plane contact surface will in principle bear on this at one point. As the press force is distributed over a predictable number of small points where the contact pressure also will be very high reproducible results are obtained.

The angle of the louvers to the common plane can be for example be between 25° and 65°, and particularly about 45°. When the contact pressure is applied the angle is diminished to give the rebounding pressure and the reduction in angle can suitably be between about 5° and 30° and particularly around 10°. Plastic deformation of the louvers should be avoided and all deformations should preferably be elastic. To prevent a too great deformation of the louvers spacers can be placed between the contact surfaces of the electrode parts, for example in the form of a frame around the louvers, a defined thickness of the material keeping the different louvers together or as a recessed positioning of the louver unit at one or both of the contact surfaces.

The pressure of the louvers against the contact surface is important for the durable conductivity, as has been mentioned. The possible contact pressure is dependent on the thickness and the modulus of the elasticity of the material in the louvers. The thickness of the material is suitably greater than 0.05 mm and preferably also greater than 0.1 mm. Thicknesses above 2 mm do not give any considerable improvements and the material thickness is suitably kept below 1 mm. The contact pressure for each louver can be kept low as the pressure will still be high due to the small contact surface. The force for each louver should, however, be above 5 N, and preferably also above 10 N and most preferably above 30 N. Press forces above 200 N do not give any improvements and press forces below also 150 N are suitably used.

The louver material is suitably a metal selected, among other things, with respect to hardness, electrical conductivity and corrosion resistance. Owing to the high point pressure problems with hydride formation in the contact surface can, as a rule, be avoided even when the louver material is proton permeable but preferably a material which is not proton permeable is used. Such metals can for example be gold, silver, tin, nickel, chromium, cobalt, wolfram, lead, cadmium, molybdenum and copper. The softer ones of these metals must usually be alloyed to have a sufficient hardness. Rustless steel and copper alloyed with beryllium are particularly suitable. The louvers can advantageouly be plated with a more noble metal to improve conductivity and further reduce the tendency to film formation. Nickel, copper, platinum, gold and particularly silver can be suitable metals for plating.

The common plane for the unit of several louvers can be curved and it is thus possible to have an electrical connection also between curved surfaces in the electrode. However, it is prefered that the surfaces to be connected are plane. Coarse unevennesses in the surfaces must be removed but there are no high requirements on the surface finish. The surfaces must, however, be clean and free from oxide films and thus blasting and degreasing might be required and optionally also a treatment with an oxide protective coating. Plating with other metals as above can be carried out but is generally only necessary for strongly film forming metals such as aluminium.

The number of louvers in the construction is decided with respect to the fact that the continuous current in each louver should not be above 200 A and preferably not above 100 A. For an efficient utilization the current for each louver should, however, be above 10 A and can also be above 20 A. It is generally desirable to have the required number of louvers distributed over several louver units to make it possible to have the contact points spread over a greater part of the electrode parts to be connected. Too extensive transverse transport currents in the electrode parts are hereby avoided.

The material in the electrode parts to be electrically connected can without disadvantages be different as they do not have to get into direct contact with each other, which can give rise to unfavourable reactions, and as there are no requirements that the joint be tightly mechanically joined, which can cause problems when there are differences in heat expansion. Further, it is possible to efficiently seal the area with the louvers so that also film forming and corrodible materials can be present. If, for example, the joint according to the invention is used between the anode- and cathode-side respectively of a bipolar electrode for chlorate electrolysis the contact surface of the cathode can comprise e.g. iron, aluminium, nickel, lead, zinc or tin, but is usually of rustless steel or particularly common steel. The material on the anode side can be an anodically film forming material such as wolfram, tantalum, niobium, vanadium, hafnium, zirkonium and especially titanium. The side of the electrode part which is turned away from the contact surface and towards the electrolytic cell further has, at least on the anode side, an electrochemically active coating of for example ruthenium, rhodium, palladium, osmium, iridium or platinum or oxides thereof, or oxides of non-noble metals, optionally in solid solution or crystalline mixture with the film forming body materials. However, these electrochemically active coatings are as a rule not used on the surfaces to be electrically connected.

Where the louvers are positioned in the contact joint the contact surfaces are separated from each other out of necessity. Outside this area the surfaces can, however, be in contact with each other, and in that case special spacing means are not required if the louvers are positioned in recesses. However, as indicated above, it is not always possible to allow different materials to be in direct contact with each other in the construction. At chlorate production titanium is for example often used on the anode side but this material will, however, on the cathode side and particularly in contact with suitable cathode materials such as iron easily form titanium hydride which reduces the electrical conductivity and influences the dimensional stability. It can then be suitable to keep the surfaces separated from each other over the entire joint area which can be achieved by means of spacer bodies or by means of inserted sealings. In the actual contact point between the louvers and the joint surfaces the hydride formation is counteracted by the high contact pressure. The purely mechanical joining of the parts can be carried out in different ways and bolting or riveting can be used without disadvantages owing to the small required contact pressure and hereby material which is not proton conductive can be selected for part of the bolt or nail joint or the entire joint if there is a risk of hydride formation.

Independent of the method of joining, the area between the contact surfaces must be sealed to prevent electrolyte penetration and it is particularly important to protect the area between the louvers from being affected both by electrolyte and gases to achieve a high and long-lasting conductivity. Sealings can thus be required around the louver area and preferably around the entire periphery of the electrode parts by using sealing strips, sealing compounds or soldering with silver solder. When metals which are permeable to atomic hydrogen are present hydrogen gas of a very high pressure can be formed in cavities in the electrode construction, for example at the louvers, which is a further factor to consider. The pressure can be released by connecting the cavity with the surrounding environment via a passage with a material which is permeable to gas but not to electrolyte, or by using such a material in the sealings. Suitable materials of this type are silicons and more preferably fluorinated thermoplastics such as polytetrafluoro ethylene and fluorinated polyethylene. The sealing can constitute an essential part of the spacing means between the parts and should then be selected from an elastic but dimensionally stable material such as rubber, optionally coated with a hydrogen permeable material as above.

If two metal plates of different materials are connected in the described manner they can be used directly as a plane bipolar electrode if the outer surfaces of the plates are adjusted to their respective electrochemical functions as anode- and cathode material respectively. However, it is particularly suitable to use the joint for bipolar finger electrodes whereby a number of plane electrode fingers are fastened to the outer surfaces of both plates essentially perpendicular to the plates which are of an electrolytically active material or coated with such a material.

The electrode fingers on one side of the plate are then intended to be the anode in one cell compartment and to interfoliate with cathode fingers from an adjacent electrode while the electrode fingers on the other side are intended to form the cathode in an adjacent cell compartment and to interfoliate with corresponding anode fingers from another finger electrode. The electrode fingers can be fixed to the joint by any method but to obtain the most compact construction it is preferred to use welding. However, the joint should hereby be protected from too great temperatures and it is particularly suitable to use laser welding. The joint according to the invention fulfils the high requirements on dimensional stability and conductivity in these constructions particularly well.

DESCRIPTION OF DRAWINGS

Figure 1:
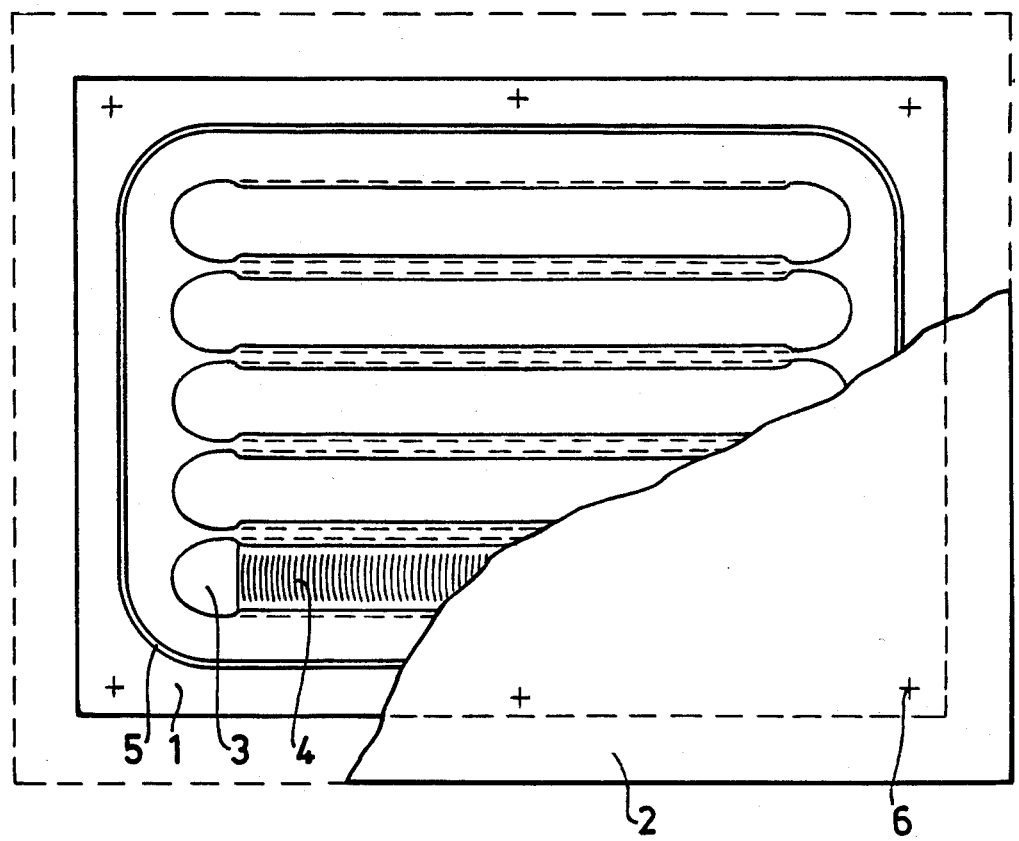
FIG. 1 shows a preferred embodiment of a contact joint according to the invention with a partially removed anode.
Figure 2:
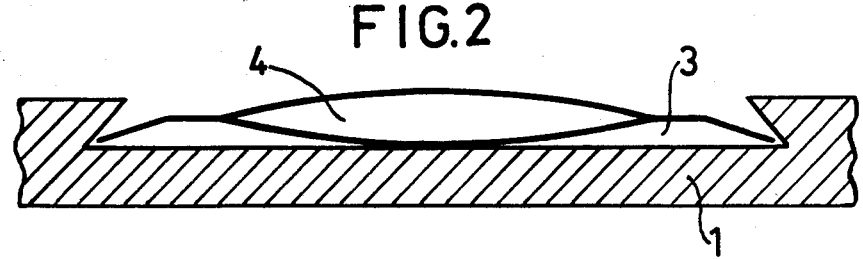
FIG. 2 shows a cross-section through a recess in one plate with an inserted louver unit.
Figure 3:
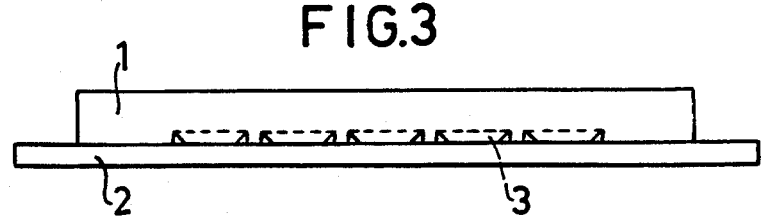
FIG. 3 shows in view from one side how the recesses are arranged.

A base plate for a bipolar finger electrode, intended to be provided with electrode fingers perpendicular to the plate on both sides, is formed from a thicker steel plate 1 with a smaller surface and a thinner titanium plate 2 with a larger surface. In the thicker steel plate 1 recesses with a surface which increases towards the bottom have been made but the recesses can alternatively be arranged in the titanium plate if it is desirable to facilitate replacement of the more corrodible steel plate. Louver units 4 with a plurality of louvers arranged in a row are placed in the recesses 3 and the individual louvers are at an angle of about 45° to the plates 1 and 2. A sealing 5 which is impermeable to liquid but permeable to hydrogen gas is placed around the recesses with the louvers. The plates 1 and 2 are mechanically joined by a few bolts or rivets 6 along the periphery of the stell plate 1.

I claim:

1. A bipolar electrode comprising a two-part base plate (1, 2), one part being the anode side in a cell space and containing titanium and the other part being the cathode side in an adjacent cell space and containing iron, both parts having electrode fingers fixed essentially perpendicular to the base plates, wherein electrical contact between the base plate is maintained by means of a plurality of elastic and electrically conductive louvers (4), said louvers being pressed into contact with the parts of said base plate by means of a mechanical joint between the parts of the base plate, and said louvers being arranged between parts of the base plate in such a manner that the contact lines of the louvers between parts of the base plate are essentially parallel to the electrode fingers on the same base plate, and the space between the parts of the base plate being sealed (5) so as to prevent electrolyte penetration but to allow hydrogen penetration.

2. A biopolar electrode according to claim 1 wherein the louvers are positioned in recesses (3) in the surface of one of the parts of the base plate.

* * * * *